United States Patent [19]

Banwart

[11] Patent Number: 5,357,571
[45] Date of Patent: Oct. 18, 1994

[54] METHOD FOR POINT-TO-POINT COMMUNICATIONS WITHIN SECURE COMMUNICATION SYSTEMS

[75] Inventor: Dean E. Banwart, Elgin, Ill.

[73] Assignee: Motorola, Inc., Schaumburg, Ill.

[21] Appl. No.: 84,119

[22] Filed: Jul. 1, 1993

[51] Int. Cl.⁵ ............................................. H04L 9/00
[52] U.S. Cl. .......................................... 380/21; 380/9; 380/20; 380/43; 380/49
[58] Field of Search ................... 380/9, 21, 29, 43, 45, 380/49, 50, 20, 48

[56] References Cited

U.S. PATENT DOCUMENTS 4,182,933  1/1980  Rosenblum ........................ 380/21
5,204,901  4/1993  Hershey et al. ................... 380/21

Primary Examiner—Bernarr E. Gregory
Attorney, Agent, or Firm—Timothy W. Markison

[57] ABSTRACT

In a secure communication system, a secure point-to-point communication may be accomplished in the following manner. A first communications unit receives a request from an operator for a point-to-point communication identifying at least one destination communication unit. In response, the first communication unit generates a private call key variable by modifying an encryption key variable through the use of a predetermined function. Identity of the encryption key variable and information pertaining to the predetermined function is transmitted by the first communication unit to the destination communication unit. Upon receiving the identity of the encryption key variable and information pertaining to the predetermined function, the destination communication unit generates the private call key variable. When the private call key variable has been determined by the first communication unit and the destination communication unit, both communication units can engage in the secure point-to-point communication.

18 Claims, 2 Drawing Sheets

METHOD FOR POINT-TO-POINT COMMUNICATIONS WITHIN SECURE COMMUNICATION SYSTEMS

FIELD OF THE INVENTION

The present invention relates generally to communication systems and, in particular, to a method for providing point-to-point communications within secure communication systems.

BACKGROUND OF THE INVENTION

Communication systems are known to comprise mobile transmitters and receivers, such as in-car mobile or hand-held portable radios, hereafter referred to as communication units, as well as fixed transmitters and fixed receivers, such as base stations or controllers (fixed end). A typical message within such a communication system may begin with a mobile unit converting an audio signal into a digital data stream suitable for transmission over an RF (radio frequency) channel to either another communication unit or the fixed end. Such systems are often used by public safety institutions, such as local or federal law enforcement agencies. The existence of commercially available radio frequency scanners makes it possible for unauthorized parties to monitor the information transmitted within such a communication system. To reduce unauthorized eavesdropping, communication systems encrypt communications such that, without knowledge of the encryption method and a decryptor, the communications are unintelligible.

As is known, digital encryption methods use a reversible algorithm to introduce randomness into a digital data stream. An algorithm that randomizes digital data is called an encryptor; that which reconstructs the original data from the randomized data, a decryptor. An encryptor/decryptor algorithm typically utilizes dynamic parameters, often referred to as keys or key variables, to uniquely specify the nature of the randomness introduced to the digital data stream. Thus, only encryptors and decryptors utilizing an identical algorithm and key are capable of reproducing intelligible messages. An example of an encryptor/decryptor algorithm is the Data Encryption Standard (DES). Typically, each communication unit within a secure communication system Can store anywhere from one to twenty keys for use in encrypted communications. A communication unit's capacity for key storage is typically limited by the cost of the storage devices and protection technology required to safely maintain a set of keys.

The limited number of keys which i a secure communication unit may typically store precludes the use of many features commonly found in unencrypted communication systems. For example, if two users within a secure communication system wished to initiate a secure point-to-point communication with one another such that no one else in the communication system, in addition to those outside the communication system, could monitor their call, they would require the exclusive use, for an indefinite period of time, of at least one of the limited number of keys available to all of the communication units within the system. In very large secure systems containing hundreds or even thousands of communication units, such exclusive use of key variables is obviously inefficient. Furthermore, such a communication would have a degree of privacy but would not, in general, be completely secure in that other units within the system could monitor the communication by trying each of the limited number of keys until the conversation was rendered intelligible. To prevent this situation, a unique key variable would need to be available to each communication unit in the system. The number of unique keys that would need to be added to each communication unit to accommodate all possible point-to-point communications in a large system, as well as the additional processing required to determine which key is being utilized, is prohibitive. Therefore a need exists for a method which allows point-to-point communications to be accomplished within secure communication systems without the inefficient exclusive use of key variables or the addition of a large number of unique key variables in each communication unit.

DESCRIPTION OF A PREFERRED EMBODIMENT

Generally, the present invention provides a method for secure point-to-point communications within a secure communications system. This is accomplished by allowing a plurality of communication units within the system to generate unique encryption key variables from a limited set of encryption key variables stored in each communication unit. For example, an Operator of a first communication unit selects at least one destination communication unit for a point-to-point communication. A private call key variable is generated by the first communication unit by modifying an encryption key variable of the limited set of encryption key variables based on a predetermined function. An identity of the encryption key variable and information pertaining to the predetermined function used to generate the private call key are transmitted by the first communication unit to the destination communication unit, which in turn generates the private call key variable based on the identity of the encryption key variable and information pertaining to the predetermined function. At this point, the first communication unit and the destination communication unit(s) are free to engage in a secure point-to-point communication without other communication units in the secure system being able to eavesdrop or without having to add a large number of encryption keys to the secure system.

Figure 1:
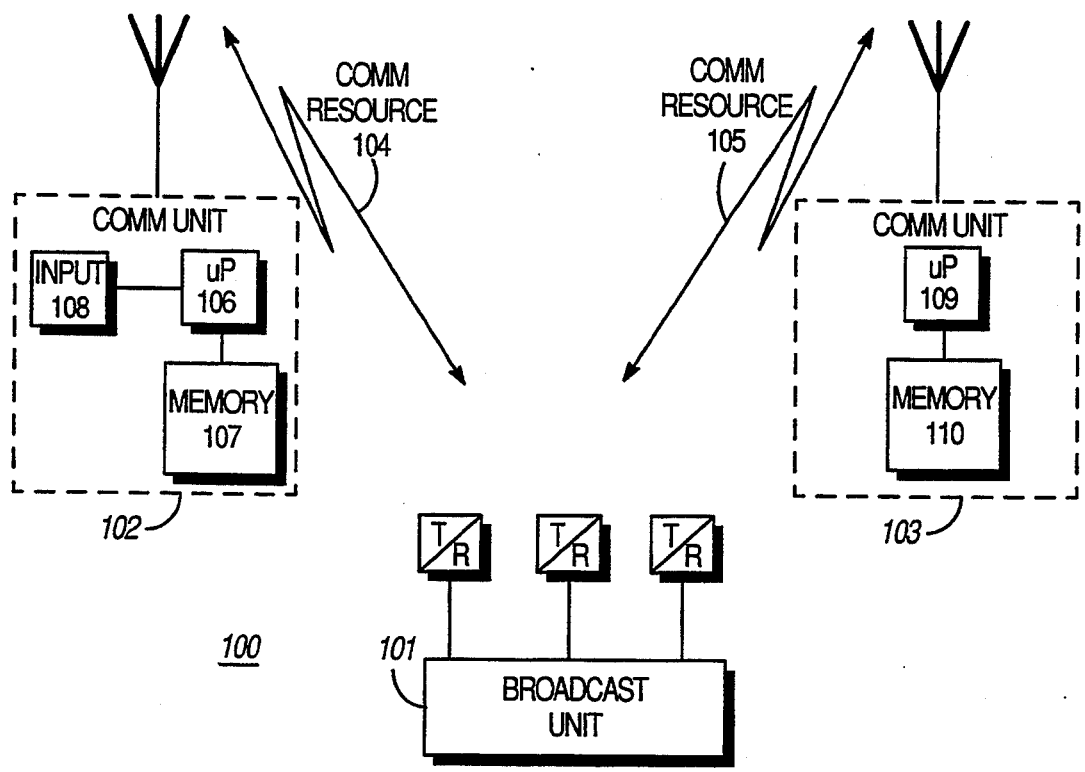
FIG. 1 illustrates a communication system in accordance with the present invention.

The present invention can be more fully described with reference to FIGS. 1 and 2. FIG. 1 illustrates a communication system (100) that may be either a trunking communication system, a conventional communication system, or a communication system network. Regardless of system type, the communication system (100) includes at least one broadcast unit (101), a plurality of communication units (102-103), and a limited number of communication resources (104-105). Communication unit 102 further includes, in part, a microprocessor (or microprocessor network) (106), a memory device (107), microprocessor network) (106), a memory device (107), and an input/output device (108). Communication unit 103 further includes, in part, a microprocessor (or microprocessor network) (109), and a memory device (110). It is understood that either or both of the communication units (102-103) could include an input/output device. Furthermore, it is assumed that all communication units operating within the communication system (100) comprise an encryptor/decryptor device, as previously described, which are not shown for simplicity.

The broadcast unit (101) may comprise a base station or repeater station in single or multiple form such as a Quantar digital base station as manufactured by Motorola Inc. The broadcast unit (101) may be configured to interface with multiple communication resources (104–105) as required to implement features or services of conventional, trunked, or cellular communications systems.

The communication resources (104–105) may comprise an RF channel such as pairs of frequency carriers, time division multiplex (TDM) slots, or any other RF transmission mediums, or a physical link such as a phone line. The communication units (102–103) may comprise a handheld portable radio, a radio mounted in a vehicle fixed dispatch type equipment, or cellular radio-telephone equipment such as ASTRO digital radios which are manufactured by Motorola, Inc. The microprocessors (106, 109) provide control and communications processing for the communication units (102–103) and may comprise 68302 microprocessors as manufactured by Motorola, Inc. The memory devices (107, 110), which may be RAM (random-access memory), ROM (read-only memory) (electrically-erasable programmable read-only memory), or any other means for storing digital information, store a set of encryption key variables (up to 20) and also a unique identification code of the communication units (102–103).

The input/output device (108) comprises a device capable of retrieving control information from an operator and/or providing information to the operator. The input/output device (108) may be via keypad, knob, buttons, card reader, PCMCIA (personal computer memory card international association standard) module, lights, LED's (light-emitting diodes), alphanumeric display, or network interface to other computers or microprocessors.

When directed to establish an encrypted communication session, such as an encrypted group-wide call, the microprocessor (106, 109) retrieves an encryption key variable from memory storage (107, 110). This information is used in conjunction with the encryptor/decryptor device to encrypt/decrypt information normally transmitted to/from other communication units. In order for all communication units involved in the group-wide call to reproduce intelligible information, they must each be utilizing the identical encryption key variable. Conversely, if an operator of a communication unit washed to engage in a point-to-point communication, they Would require the exclusive use of an encryption key variable for the duration of the communication, thereby preventing other communication units from legitimately using that key.

Figure 2:
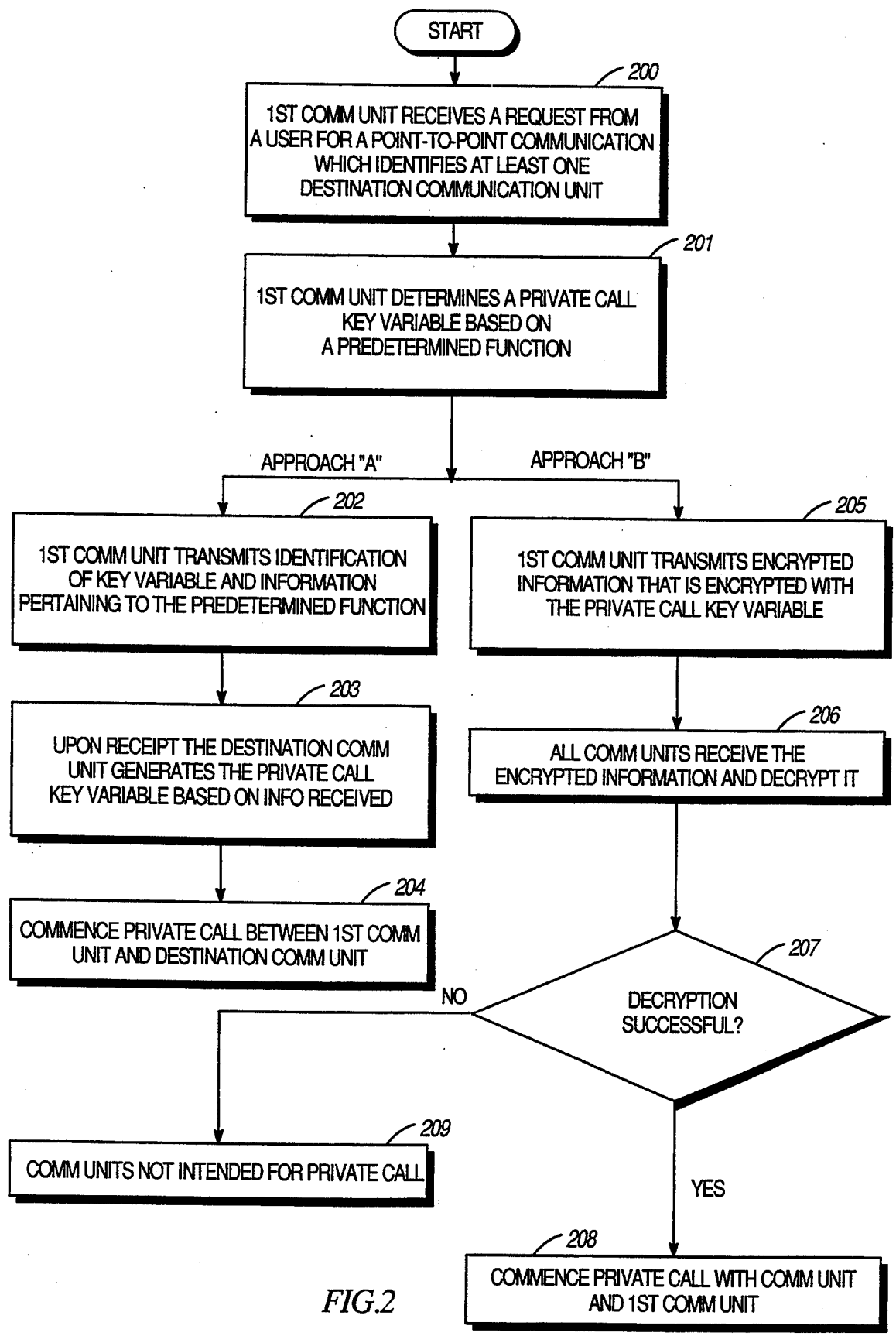
FIG. 2 illustrates a logic diagram which may be incorporated by communication units to implement the present invention.

FIG. 2 illustrates a logic diagram which may be incorporated by communication units within a secure communication system to implement the present invention. Hereafter, the term "secured private call" shall be used to reference a secure point-to-point communication. At step 200, an operator of a first communication unit uses the unit's input/output device(S) to request a secured private call such that the user inputs a unique identification code of at least one destination communication unit.

To ensure the security of the point-to-point communication, the first communication unit determines a private call key variable (201). To this end, a predetermined function is used to modify an encryption key such that the resultant private all key variable is unique and reproducible. As a first example of the predetermined function, the operator of the first communication unit is prompted for a unique user code in addition to the unique identification code of the destination communication unit(s). The unique user Code is used to modify an encryption key variable via a known process, discussed below, to create the private call key variable such that the private call key variable is equal in length and validity as the encryption key variable.

In a second example of the predetermined function, a unique identification code of the first communication unit or the unique identification code of the destination communication unit or a combination of the two is used to modify an encryption key variable via a known process, discussed below, to create the private call key variable such that the private call key variable is equal in length and validity as the encryption key variable. A variety of known processes can be used in the implementation of the predetermined functions to achieve the actual modification of an encryption key variable.

For example, the known process Can transform both the encryption key variable and the unique user code to a binary format. The unique user code is expanded to the same number of binary bits as the encryption key variable through concatenation or extension, such as a simple duplication of the unique user code. The resulting two, equal length, binary values are combined in to the private call key variable using a logical transform such as modulo-2 addition. The validity of the private call key variable is checked to ensure that proper parameters are met (parity, mutual orthogonality to other key variables) and additional modifications of the private call key variable are enacted, if necessary, to meet these criterion. A variation of this process utilizes logical left or right shifting of the encryption key variable (in binary form) with alternate modulo-2 addition of the result within the original encryption key variable. The number of times this sequence is followed is derived from the value of the unique user code.

In an alternate, but more complex, example of the known process, a linear feedback shift register (LFSR) circuit is used to generate a pseudorandom sequence of known length. The unique identification code of the destination communication unit(s) cab be used as an indexed starting point within this keydown sequence to derive a binary value which may then be combined, via modulo-2 addition, with the encryption key variable. Another approach using an LFSR circuit utilizes the unique identification code of the destination communication unit to alter the feedback arrangement of the LFSR circuit to obtain a unique output sequence. As before, the unique output sequence in then combined with the encryption key variable to derive the private call key.

To convey the private call key variable to the at least one destination communication unit, the initiating, or first, communication Unit may use approach "A" or approach "B". Approach "A" follows steps 202–204 while approach "B" follows steps 205–209. Approach "A" is discussed first.

At step 202, the first communication unit assembles information pertaining to the predetermined function and transmits it, along with identification of the encryption key variable used in the creation of the private call key variable, to the destination communication unit. The information pertaining to the predetermined function, assuming the use of the first example of a predetermined function discussed above, includes, but is not limited to, an indication that a unique user code has been used in conjunction with a know process to derive the private call key variable, identification of the known process used, and other information necessary for the stand and operation of the system such as the unique identification code of the first communication unit and/or the inique identification code of the destination communication unit. The identification of the encryption key variable is typically an index number or label capable of uniquely identifying which key of the limited set is being used. It is assumed in this case that the operator of the destination communication unit has prior knowledge of the unique user code used to derive the private call key variable.

Alternately, the information pertaining to the predetermined function, assuming the use of the second example of a predetermined function discussed above, includes, but is not limited to, an indication that either, or both, of the unique identification codes of the first communication unit and/or the destination communication unit have been used in conjunction with a know process to derive the private call key variable, identification of the known process used, and other information necessary for the standard operation of the system such as the unique identification code of the first communication unit and/or the unique identification code of the destination communication unit.

When the destination communication unit receives the identification of the encryption key variable and the information pertaining to the predetermined function, it generates the private call key variable (203). If the first example of the predetermined function is used, the unique user code indicator (included in the information pertaining to the predetermined function) is detected and the operator of the destination communication unit is prompted to enter the unique user code. To generate the private call key variable, the destination communication unit performs the same predetermined function (as indicated by the information pertaining to the predetermined function) as performed by the first communication unit in step 201. The resulting key variable will match the private call key variable used in the first communication unit.

If, however, the second example of the predetermined function is used, the indication that either, or both, of the unique identification codes of the first communication unit and/or the destination communication unit have been used to derive the private call key variable is detected. Once again, the destination communication unit performs the same predetermined function (as indicated by the information pertaining to the predetermined function) as performed by the first communication unit in step 201 to derive the private call key variable.

Having generated the private call key, both the first communication unit, and the destination communication unit can engage in the secured private call (204) without the exclusive use of an encryption key variable. Those communication units not in possession of the private call key variable are not able to participate in the secured private call, however, they are at liberty to use any of the encryption keys of the limited set for normal secure communications, such as group calls.

When approach "B" is followed, the process proceeds to step 205. It is assumed that whenever approach "B" is utilized, the second example of the predetermined function, discussed in conjunction with step 201, is. used to generate the private call key variable. That is, the unique identification code of the first communication unit or the unique identification code of the destination communication unit or a combination of the two is used to modify the encryption key variable.

At step 205, the first communication unit uses the private call key variable to create encrypted information (voice or data message) which is subsequently transmitted to the plurality of communication units. In addition to the encrypted information, the first communication unit also transmits unique communication unit information that comprises, but is not limited to, an identification of the encryption key variable used to derive the private call key, identification of the known process used, and encryption synchronization data fields. It is important to note that the unique identification code of the first communication unit and the unique identification code of the destination communication unit are not transmitted. The identification of the encryption key variable is identical to that described in approach "A". The encryption synchronization data fields allow communication units to determine if decryption is occurring properly.

All communication units that receive the encrypted information and the unique communication unit information attempt to generate the private call key variable (206). As before, the plurality of communication units perform the same predetermined function (as indicated by the unique communication unit information) as that performed by the first communication unit in step 201 to derive the private call key variable. Only the destination communication unit will produce a variable which matches the private call key variable of the first communication unit. As is known, the encryption synchronization data fields allow each of the plurality of communication units to determine if they are decrypting the encrypted information correctly.

If, the decryption process is successful (207), as would be the case for the destination communication unit, the private call key is used in both the first communication unit and the destination communication to engage in the secured private call (208). Again, the exclusive use of an encryption key variable for the secured private call is not necessary and the remaining non-destination communication units (209) are free to use the entire limited set of encryption variables.

The present invention provides method for point-to-point communications (secured private calls) within secure communications systems. With such a method, the cost and complexity needed to store and protect the large number of encryption key variables required for selectively secured private calls is substantially eliminated. The present invention provides a method for generating a large number of private call key variables through the modification of a smaller number of fully protected encryption key variables with a predetermined function. In providing a large number of private call key variables, the present invention allows users of a secure communication system to engage in point-to-point secure communications without unduly monopolizing scarce encryption key resources.

I claim:

1. In a secure communication system that includes a plurality of communication units, wherein each communication unit of the plurality of communication, units stores a limited set of encryption key variables, a method for providing a point-to-point communication within the secure communication system, the method comprises the steps of:
  a) receiving, by a first communication unit of the plurality of communication units, a request for the point-to-point communication from an operator of the first communication unit, wherein the request identifies at least one destination communication unit;
  b) generating, by the first communication unit, a private: call key variable by modifying an encryption key variable of the limited set of encryption key variables based on a predetermined function;
  c) transmitting, by the first communication unit to the at least one destination communication unit, identity of the encryption key variable and information pertaining to the predetermined function;
  d) generating, by the at least one destination communication unit, the private call key variable based on the encryption key variable and the information pertaining to the predetermined function; and
  e) privately communicating between the first communication unit and the at least one destination communication unit using the private call key variable.

2. In the method of claim 1, step (b) further comprises generating the, private call key variable by modifying the encryption key variable based on the predetermined function, wherein the predetermined function includes, at least in part, using a unique identification code of the first communication unit, a unique identification code of the at Least one destination communication unit, or a combination of the unique identification code of the first communication unit and the unique identification code of the at least one destination communication unit to modify the encryption key variable.

3. In the method of claim 2, step (c) further comprises transmitting identity of the encryption key variable and information pertaining to the predetermined function, wherein the information pertaining to the predetermined function includes, in part, the unique identification code of the first communication unit, the unique identification code of the at least one destination communication unit, or the combination of the unique identification code of the first communication unit and the unique identification code of the at least one destination communication unit.

4. In the method of claim 2, the predetermined function further comprises utilizing unique user code to produce the private call key variable.

5. In the method of claim 1, step (d) further comprises identifying, by the at least one destination communication unit, type of the predetermined function such that the private call key variable is generated.

6. In a secure communication system that includes a plurality of communication units, wherein each communication unit of the plurality of communication units stores a limited set of encryption key variables, a method for providing a point-to-point communication within the secure communication system, the method comprises the steps of:
  a) receiving, by a first communication unit of the plurality of communication units, a request for a point-to-point communication from an operator Of the first communication unit, wherein the request identifies at least one destination communication unit;
  b) generating, by the first communication unit, a private call key variable by modifying an encryption key variable of the limited set of encryption key variables based on a predetermined function;
  c) transmitting, by the first communication unit, encrypted information, wherein the encrypted information is, at least in part, encrypted with the private call key variable;
  d) receiving, by the plurality of communication units, the encrypted information;
  e) decrypting, by each unit of the plurality of communication units, the encrypted information based on a stored predetermined function and unique communication unit information; and
  f) when the decrypting of step (e) is successful, communicating, by at least one of the plurality of communication units, with the first communication unit using the private call key variable.

7. In the method of claim 6, step (b) further comprises generating the private call key variable by modifying the encryption key variable based on the predetermined function, wherein the predetermined function includes, at least in part, using a unique identification code of the first communication unit, a unique identification code of the at least one destination communication unit, or a combination of the unique identification code of the first communication unit and the unique identification code of the at least one destination communication unit to modify the encryption key variable.

8. In the method of claim 6, step (e) further comprises identifying, by each of the plurality of communication units, type of the predetermined function such that the private call key variable is generated.

9. In a secure communication system that includes a plurality of communication units, wherein each communication unit of the plurality of communication units stores a limited set of encryption key variables, a method for a communication unit of the plurality of communication units to participate in a point-to-point communication within the secure communication system, the method comprises the steps of:
  a) when initiating the point-to-point communication, receiving, by the communication unit, a request for a point-to-point communication from an operator of the communication unit, wherein the request identifies at least one destination communication unit;
  b) when initiating the point-to-point communication, generating, by the communication unit, a private call key valuable by modifying an encryption key variable of the limited set of encryption key variables based on a predetermined function;
  c) when initiating the point-to-point communication, transmitting, by the communication unit to the at least one destination communication unit, identity of the encryption key valuable and information pertaining to the predetermined function;
  d) when acting as a destination communication unit in the point-to-point communication, receiving, by the communication unit, identity of the encryption key variable and the information pertaining to the predetermined function, wherein the identity of the encryption key variable and information pertaining to the predetermined function have been transmitted by a transmitting communication unit;
  e) when acting as the destination communication unit in the point-to-point communication, generating, by the communication unit, the private call key variable based on the encryption key variable and the information pertaining to the predetermined function; and f) when acting as the destination communication unit in the point-to-point communication, privately communicating between the communication unit and the transmitting communication unit.

10. In the method of claim 9, step (b) further comprises generating the private call key variable by modifying the encryption key variable based on the predetermined function, wherein the predetermined function includes, at least in part, using a unique identification code of the communication unit, a unique identification code of the at least one destination communication unit, or a combination of the unique identification code of the communication unit and the unique identification code of the at least one destination communication unit to modify the encryption key variable.

11. In the method of claim 10, step (c) further comprises transmitting identity of the encryption key variable and information pertaining to the predetermined function, wherein the information pertaining to the predetermined function includes, in part, the unique identification code of the communication unit, the unique identification code of the at least one destination communication unit, or the combination of the unique identification code of the communication unit and the unique identification code of the at least one destination communication unit.

12. In a secure communication system that includes a plurality of communication units, wherein each communication unit of the plurality of communication units stores a limited set of encryption key variables, a method for a communication unit of the plurality of communication units to receive a point-to-point communication within the secure communication system, the method comprises the steps of:

a) receiving, by the communication unit, identity of an encryption key variable and information pertaining to a predetermined function, wherein the identity of the encryption key variable and information pertaining to the predetermined function have been transmitted by a transmitting communication unit;

b) generating, by the communication unit, a private call key variable based on the encryption key variable and the information pertaining to the predetermined function; and c) utilizing the private call key variable to privately communicate with the transmitting communication unit.

13. In the method of claim 12, step (b) further comprises generating the, private call key variable by modifying the encryption key variable based on information pertaining to the predetermined function, wherein the information pertaining to the predetermined function includes, at least in part, a unique identification code of the communication unit, a unique identification code of the transmitting communication unit, or a combination of the unique identification code of the communication unit and the unique identification code of the transmitting communication unit.

14. The method of claim 13 further comprises identifying, by the communication unit, type of the predetermined function such that the private call key variable is generated.

15. In a secure communication system that includes a plurality of communication units, wherein each communication unit of the plurality of communication units stores a limited set of encryption key variables, a method for a communication unit of the plurality of communication units to participate in a point-to-point communication within the secure communication system, the method comprises the steps of:

a) when initiating the point-to-point communication, receiving, by the communication unit, a request for a point-to-point communication from an operator of the communication unit, wherein the request identifies at least one destination communication unit;

b) when initiating the point-to-point communication, generating, by the communication unit, a private call key variable by modifying an encryption key variable of the limited set of encryption key variables based on a predetermined function;

c) when initiating the point-to-point communication, transmitting, by the communication unit, encrypted information, wherein the encrypted information is, at least in part, encrypted with the private call key variable;

d) when acting as a destination communication unit in the point-to-point communication, receiving, by the communication unit, encrypted information, wherein the encrypted information has been encrypted using the private call key variable by a transmitting communication unit;

e) when acting as the destination communication unit in the point-to-point communication, decrypting, by the communication unit the encrypted information i based on a stored predetermined function and unique communication unit information and f) when acting as the destination communication unit in the point-to-point communication, when the decanting of step (e) is successful, communicating, by the communication unit, with the transmitting communication unit using the private call key variable.

16. In the method of claim 15, step (b) further comprises generating the private call key variable by modifying the encryption key variable based on the predetermined function, wherein the predetermined function includes, at least in part, using a unique identification code of the communication unit, a unique identification code of the at least one destination communication unit, or a combination of the unique identification code of the communication unit and the unique identification code of the at least one destination communication unit to modify the encryption key variable.

17. In a secure communication system that includes a plurality of communication units, wherein each communication unit of the plurality of communication units stores a limited set of encryption key variables, a method for a communication unit of the plurality of communication units to receive a point-to-point communication within the secure communication system, the method comprises the steps of:

a) receiving, by the communication unit, encrypted information, wherein the encrypted information has been encrypted using a private call key variable by a transmitting communication unit;

b) decrypting, by the communication unit, the encrypted information based on a stored predetermined function and unique communication unit information; and c) when the decrypting of step (b) is successful, communicating, by the communication unit, with the transmitting communication unit using the private call key variable.

18. In the method of claim 17, step (b) further comprises identifying, by the communication unit, type of the predetermined function such that the private call key variable is generated.

* * * * *